Jan. 3, 1967  W. BROOKS  3,296,530
VOLTAGE CONTROLLED ELECTROLUMINESCENT METER DISPLAY
Filed Sept. 28, 1962
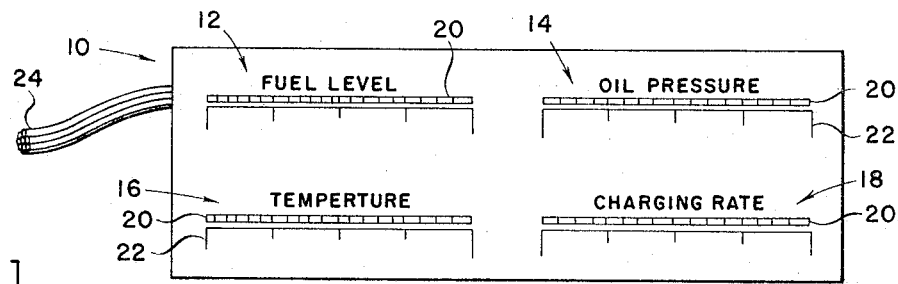
Fig. 1
Fig. 3
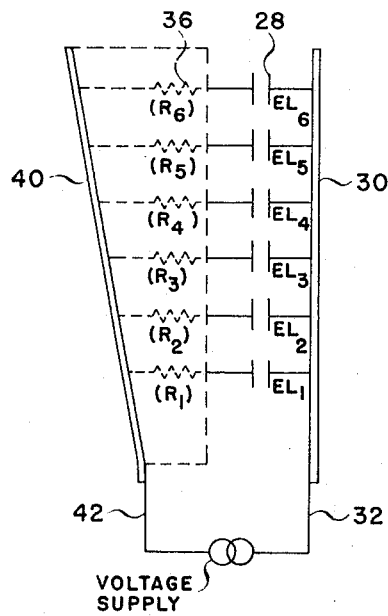
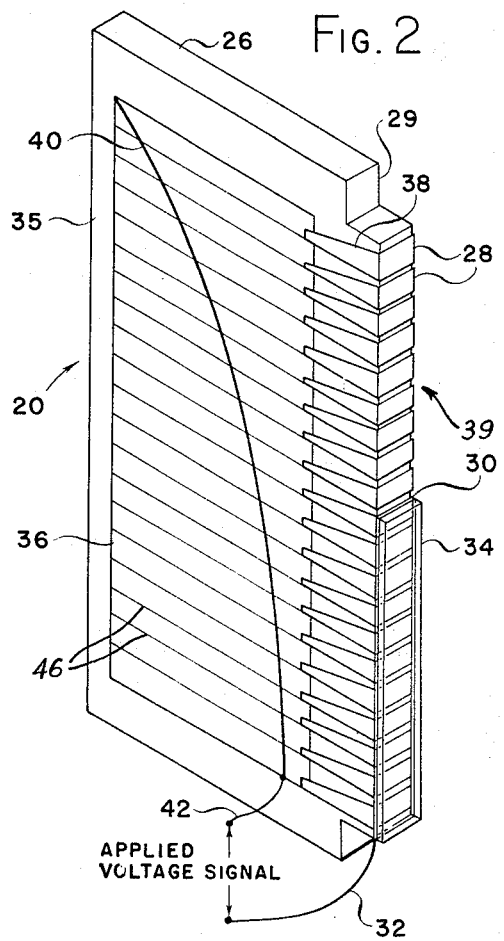
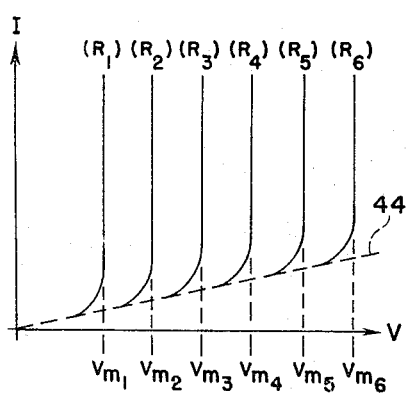
Fig. 4
INVENTOR.
WILLIAM BROOKS
BY
George C. Sullivan
Agent

United States Patent Office 3,296,530
Patented Jan. 3, 1967

3,296,530
VOLTAGE CONTROLLED ELECTROLUMI-NESCENT METER DISPLAY
William Brooks, Sunnyvale, Calif., assignor to Lockheed Aircraft Corporation, Burbank, Calif.
Filed Sept. 28, 1962, Ser. No. 227,005
5 Claims. (Cl. 324—122)

This invention relates to the voltage controlled electroluminescent displays, and more particularly to voltage controlled electroluminescent displays having therewith non-linear voltage dependent resistance components which determine the order in which each associated electroluminescent cell will be excited.

In the prior art, a predominance of mechanical or electromechanical meter movements have been employed to register and display the magnitude of certain parameters of a system such as pressure, temperature, charging rate, voltage, current, power, and the like. These systems parameters may vary over wide ranging values, thus providing many opportunities for human error in reading the meters which display the magnitude of these parameters. For example, a meter having relatively small incremental separations between adjacent readings displayed on the meter may be difficult to distinguish with the human eye when viewed over a relatively long period of time. In addition, fluctuations inherent in the meter movement arrangement cause still further difficulties for the viewer. Thus, there are opportunities for significant errors to occur due to human factor or the inherent properties of the metering mechanism.

In addition to the foregoing disadvantages, it has been found that many of the aforesaid prior art parameter measuring devices may not be readily and accurately read in dimly lighted areas because it is difficult to provide each meter with adequate lighting facilities to accommodate the areas. Moreover, it has been found that the absence of adequate lighting for reading such meters may cause objectionable fatigue or strain to the human eye when one is required to read such meters in dimly lighted areas; consequently, such fatiguing effects experienced by the observer will reduce his efficiency and further increase the opportunity for significant error in reading such meters.

Another disadvantage of the prior art stems from the fact that the meters have an electromechanical movement; consequently, are subject to mechanical and/or electrical failure. More specifically, volt meters and ammeters, for example, have been plagued with burned out electrical coils which are utilized for the dial of the indicators of such meters. These burned out coils may occur as a result of a high surge of current which is applied thereto.

The present invention obviates the disadvantages and shortcomings of the prior art by providing a radically new and different approach to the display of conventional parameters, such as voltage, current, and the like, previously displayed by electromechanical meter movements in the prior art. More specifically, the present invention provides a panel display of meter readings utilizing a plurality of electroluminescent devices to indicate the magnitude of an applied voltage which is proportional to the parameter being measured, and which may be easily and accurately read in a dimly lighted area without significant fatigue to the human eye and with the elimination of the possible human error associated with prior art devices.

The electroluminescent display may be fabricated to provide practically any scale expansion, simply by printing the required magnitude of the parameter versus the voltage curve on the back thereof.

Accordingly, it is the broad objective of this invention to provide an electrical apparatus which is adaptable for present day metering panels without electromechanical meter movements.

Another object of the invention is to provide an electrical metering apparatus in which a number of electroluminescent cells illuminated on a panel are controlled by the magnitude of the applied voltage.

Still another object of the invention is to provide a metering panel having a plurality of electroluminescent cells and non-linear resistance components connected in series therewith wherein they are excited sequentially in response to an increasing applied voltage to thereby display the magnitude of the applied voltage, which may be proportional to the parameter being measured and metered.

The novel features which are believed to be characteristic of the invention, both as to its organization and method of construction and operation, together with further objects and advantages thereof, will be better understood from the following description considered in connection with the accompanying drawings in which illustrative embodiments of the invention are disclosed by way of example. It is especially understood, however, that the drawings are for purposes of illustration and description only and do not define limitations within the invention.

In the drawings:

FIGURE 1 is a diagrammatic view of a display panel illustrating that the parameters of several different systems may be measured and displayed in accordance with the invention.

FIGURE 2 is an isometric view of a typical display panel illustrating the details of the electroluminescent cells and the non-linear resistance film utilized in a display arrangement in accordance with the invention.

FIGURE 3 is a circuit diagram illustrating the arrangement of electroluminescent cells and non-linear resistance material shown in FIGURE 2.

FIGURE 4 is a plot of voltage versus current characteristics of the non-linear resistance material illustrated in FIGURES 2 and 3 in accordance with the present invention.

With reference to the drawings, there is shown in FIGURE 1 a bar graph display panel 10 for displaying the magnitude of several parameters such as a fuel level 12, an oil pressure 14, a temperature 16, and a charging rate 18, all of which are proportional to a voltage applied thereto, which will be described hereinafter in conncetion with FIGURE 2. Display panel 10 also includes a plurality of appropriate voltage terminal connections 24 through which the various voltages are applied to the respective display panels for energizing the same. The details for making electrical connection to a typical panel will be discussed in greater detail hereinbelow.

As shown in FIGURE 1, the display portion of the panel may be made up of a plurality of miniature segments which, when illuminated, appear to the human eye to be one continuous strip which extends the full length of an electroluminescent strip 20 which is utilized to indicate the magnitude of the applied voltage corresponding to the magnitude of the parameter being displayed on the panel. Thus it can readily be seen that any suitable parameter may be displayed by devising an arrangement for a voltage response that corresponds proportionally to the magnitude of the parameter being displayed. As shown in the drawing, an appropriate scale 22 is provided which permits an easy and convenient reading of the magnitude of the parameter being measured.

A more detailed description of the electroluminescent display panel 20 will be given with reference to FIG- URE 2. As shown in FIGURE 2, display panel 20 comprises an insulative support member 26 which has good heat dissipation characteristics, such as glass, for example, having a rectangular configuration and a thickness sufficient to provide the required mechanical strength to support a plurality of miniature electroluminescent segments 28 which may extend partially or the full length along one edge of the support member. A portion of the corner 29 at each of the support members may be cut away to provide means for mounting the panel. A transparent conductive film 30 extends along the entire length of the structure upon which the electroluminescent segments are disposed, providing a first input terminal connection 32 at one end thereof. The conductive film 30 may be formed upon an insulative transparent strip 34 which provides a protective covering for the conductive film and the electroluminescent segments. Along one of the broader flat surfaces of the support member, designated 35, there is disposed a non-linear resistance film 36 which is connected to each electroluminescent cell segment 28 through a corresponding number of electrical connections 38 which may be metallic foil or metal strips deposited on the support member by any suitable metal deposition process. More specifically the individual electrical connectors 38 are deposited on the substrate 26 along surface 35 and a contiguous narrow edge 39 which supports the electroluminescent segments 28. The electroluminescent material is deposited over that portion of the electrical connector deposited on the narrow edge 39 of substrate 26 with the other end of the electrical connection 38 being connected to the individual segments of resistance film 36. As illustrated in FIGURE 2, film 36 is divided by a series of horizontal dividing lines 46 into a number of individual segments to correspond to the number of electrical connections 38 to which each is connected. When electrical connections 38 are metallic foil, the ends thereof may be affixed to resistance film 36 by applying an electrically conductive or liquid solder material therebetween, or when electrical connections 38 are deposited, metallic strips, resistance film 36 may be applied to the strips directly so as to make an electrical contact. Thus, it can be seen from the drawings that each of these minute electroluminescent segments and the electrical connections are insulated from one another and connected to the non-linear resistance film 36 along a preselected edge thereof at predetermined spaced intervals.

The non-linear resistance film shown in FIGURE 2 has a common conductor 40 electrically connected thereto which functions as a connection and thereby determines the value of the resistance connected to each of the miniature electroluminescent segments. It also provides a second input terminal 42 for the applied voltage. The resistance value of the non-linear resistance film elements are determined by the common conductor 40 which terminates each horizontal section of the non-linear resistance film 36 as shown in FIGURE 3, and thereby determines the non-linear value of the film along its path. As shown in the drawings, the length of the non-linear resistance film is different for each electroluminescent segment, and in FIGURE 2, the value of the resistance is smallest for the short length segments and increases such that the largest resistance corresponds to the longest length of the non-linear resistance material connected thereto.

The non-linear resistance film 36 may be any suitable material capable of providing the required resistance and heat dissipation characteristics. In accordance with the present invention it has been found that a mixture of materials such as 80 percent silicon carbide, cadium sulfide or zinc oxide doped with 0.1 percent copper chloride by weight, which has been deposited on the insulative support member in a uniformly thick layer at least 0.004 inch thick will provide a suitable non-linear resistance film. The voltage dependent resistance (VDR) characteristic of these materials is such that above a preselected critical voltage ($V_m$), the current increases extremely rapidly. Stated in a different manner, the VDR has a low dynamic resistance above a critical point. Thus, it may be said that the characteristic curve of these materials has an avalanche point which enables a series connected electroluminescent cell to be switched on and off instantaneously when the correct magnitude of voltage is applied or lacking.

With reference to FIGURE 3 there is shown a schematic diagram illustrating the arrangement shown in FIGURE 2. As shown in the drawing, one side of each electroluminescent segment is connected to the transparent conductive coating 30, the lower end of which forms the first input terminal 32, while the remote ends of the resistive element are all connected to the calibration connection 40, whereby the lower end thereof forms the second input terminal 42, across which is connected a voltage which is to be measured.

Operation of the invention is described with reference to FIGURES 3 and 4. With reference to FIGURE 3, it can be seen that the series of electroluminescent and resistance elements are connected in parallel; that is electroluminescent cell subscript 1 is connected in series with resistive element subscript 1, electroluminescent cell subscript 2 is connected in series with resistive element subscript 2, etc. The number of electroluminescent cells are resistive elements which may be utilized by a particular unit will depend upon the magnitude of the voltage to be displayed and the length of panel required. As the variable voltage applied to terminals 32 and 42 increases across the parallel arrangement of series-connected electroluminescent and resistive elements, the current drawn by the arrangement increases according to the plot shown in FIGURE 4. As shown in FIGURE 4, the current drawn by the arrangement increases according to the slope of the dashed line designated 44. As stated hereinabove, the critical voltage ($Vm_1$) for the combination with subscript 1 occurs at an avalanche point where the electroluminescent cell is switched on instantaneously. Thus, it can be seen as the voltage increases, the current drawn by each successive series-connected electroluminescent and resistance elements increases to a critical point where each series-connected combination draws high current and the electroluminescent cell remains in an illuminated state. No values have been assigned to the voltage and current in the plot shown in FIGURE 4 for the reason that the variant for these parameters is not critical to the operation of the invention and may vary according to a preselected design. More specifically, the incremental steps of voltage may be in terms of microvolts, millivolts, volts, while the current may be in terms of microamps, milliamps, or amps, depending upon the specific design of the display panel.

It should be noted at this point that the length of the electroluminescent segment along the length of the panel may be chosen as short or as long as desirable, depending only upon the technique employed for depositing the electroluminescent phosphor to the edge of the support member, as long as it is compatible with the scale indicator associated therewith. With suitable deposition techniques, the separation between the adjacent electroluminescent segments may be microscopic, such that the human eye will not readily be able to distinguish the individual segments, and thus there will appear to be a continuous strip of illuminated phosphor when each of the segments has been switched to the illuminated state along a portion of the entire length of the display panel. It should be noted at this point that the operation of the device in accordance with the present invention does not depend upon the existence of an apparent non-intermittent break in the phosphor strip, since the selection of an appropriate scale may take into account such a discrepancy and provided a compensating factor therefor.

In closing, it is useful to summarize some of the advantages of the present invention. One such advantage involves the elimination of the electrical coil conventionally associated with the meter movements of many prior art devices and thereby eliminates the possible failure in operation of the device due to a burned out coil. The burning out of such coils may occur as a result of high surge currents or other malfunctions of a system. Another advantage arises from the fact that the illuminated areas of the electroluminescent elements may be chosen such that sufficient illumination is generated by the excited cells to provide sufficient light for reading the meter without the aid of additional lighting facilities within the equipment. This advantage is especially useful in those areas where it is desirable to maintain a dimly lighted area in the immediate vicinity of the meter, which is under observation.

Still another advantage to be derived from the present invention is that of providing a lighting arrangement which is not fatiguing to the human eye. More specifically, it has been determined by human engineers that certain types of lights cause considerable eye strain and fatigue to personnel who are required to observe instruments over an extended period of time, and that such eye strain may be significantly relieved, if not eliminated, by the selection of a proper color of the object under observation. Thus, the present invention provides a means whereby a proper selection of the color of phosphor used in the device will provide the type of color which is determined to be less fatiguing to the human eye and thereby eliminates the eye strain associated with observing such metering devices over an extended period of time, as has been experienced in the use of many prior art devices with conventional electromechanical devices and non-tailored lighting.

It is expressly understood that the above descriptive embodiment of a display panel is only illustrative of the principles applicable in the invention. Numerous other arrangements and modifications may be defined by those skilled in the art without departing from the spirit and scope of the invention. Accordingly, it is to be understood that the present invention is limited only by the spirit and scope of the disclosure set forth hereinabove and the appended claims.

What is claimed is:

1. An electroluminescent display unit, for visually displaying the value of an input voltage comprising:
    (a) a non-conductive insulative support member having a plurality of angularly disposed element support surfaces adjacent each other;
    (b) a plurality of aligned, separated electroluminescent cells mounted on one of said element support surfaces;
    (c) said cells each including a first electrical conductor, a layer of electroluminescent phosphor covering each first conductor and a second electrical conductor comprising a transparent conductor strip covering each of said first conductors and phosphor layers;
    (d) said transparent conductor strip being connected to a first electrical input terminal;
    (e) a uniform thin film of voltage dependent resistance material deposited on the second element support surface which has a high electrical resistance until a threshold voltage is reached;
    (f) said film of voltage dependent resistance material being divided into segments by a series of dividing lines to form an individual resistive segment strip for each electroluminescent cell;
    (g) each of said resistive segment strips being electrically connected at one end to the corresponding first conductor of said electroluminescent cell;
    (h) a common conductor element connected to the other end of all of said resistive segment strip elements;
    (i) said common conductor also being connected to a second electrical input terminal;
    (j) a scale immediately adjacent said aligned electroluminescent cells; and
    (k) the length of each of said resistive segment strips between said line of electroluminescent cells and said common conductor being of selected different lengths so that the input voltage applied between said two electrical input terminals will activate an electroluminescent cell adjacent said scale to give a calibrated scale reading for such voltage input.

2. The electroluminescent display unit as set forth in claim 1, wherein:
    (a) said resistive segment strips are of a given length; and
    (b) said common conductor element is placed across said resistive segment strips at an intermediate length point, in any desired linear configuration, to give a desired calibration with respect to said scale readings.

3. The electroluminescent display unit as set forth in claim 1, wherein:
    (a) said insulative support member is a planar surfaced rectangular block;
    (b) said one angularly disposed element support surface is an elongated rectangular surface of substantially the same width as said electroluminescent cells which are mounted thereon; and
    (c) said second element support surface is the same length as said one element support surface.

4. The electroluminescent display unit as set forth in claim 1, wherein:
    (a) an electrical connector strip is disposed on both of said element support surfaces to electrically connect each electroluminescent cell to its corresponding resistive segment strip; and
    (b) each of said electrical connector strips being disposed between said one element support surface and its respective electroluminescent cell.

5. The electroluminescent display unit as set forth in claim 1, wherein:
    (a) said thin film of voltage dependent resistance material is a semi-conductor material taken from the group consisting of silicon carbide, cadmium sulphide, or zinc sulphide, mixed with metal filings and doped with copper chloride; and
    (b) said thin film is at least .004 inch thick.

References Cited by the Examiner
UNITED STATES PATENTS

| | | | |
|---|---|---|---|
| 2,880,346 | 3/1959 | Nicoll | 313—108 |
| 2,988,645 | 6/1961 | Wilmotte | 313—108.1 |
| 3,039,013 | 6/1962 | Wilmotte | 313—108 |
| 3,059,132 | 10/1962 | Wasserman | 313—108 |
| 3,141,107 | 7/1964 | Wasserman | 313—108 |
| 3,149,281 | 9/1964 | Lieb | 324—96 |

WALTER L. CARLSON, *Primary Examiner.*

R. V. ROLINEC, *Assistant Examiner.*